(12) United States Patent
Hattikudru et al.

(10) Patent No.: US 9,367,856 B1
(45) Date of Patent: Jun. 14, 2016

(54) ASYNCHRONOUS ACCOUNT MODIFICATION

(71) Applicant: Amazon Technologies, Inc., Reno, NV (US)

(72) Inventors: Abhin Hattikudru, Karnataka (IN); Ajay Bhutani, Haryana (IN)

(73) Assignee: Amazon Technologies, Inc., Seattle, WA (US)

( * ) Notice: Subject to any disclaimer, the term of this patent is extended or adjusted under 35 U.S.C. 154(b) by 488 days.

(21) Appl. No.: 13/671,375

(22) Filed: Nov. 7, 2012

(51) Int. Cl.
*G06Q 30/02* (2012.01)

(52) U.S. Cl.
CPC .................. *G06Q 30/0226* (2013.01)

(58) Field of Classification Search
CPC .................................................. G06Q 30/0226
USPC .................................. 705/14.27, 14.3, 14.33
See application file for complete search history.

*Primary Examiner* — Namrata (Pinky) Boveja
*Assistant Examiner* — Azam Ansari
(74) *Attorney, Agent, or Firm* — Thorpe North & Western LLP

(57) ABSTRACT

Technology is described for asynchronously modifying a plurality of subaccounts. A method may include receiving an update request for an account having a running order value. An update sub-request may be sent for a subaccount of the account. Another operation may be receiving an expiration request for the subaccount with a consumed running order value. The expiration request may be applied to the subaccount when a determination has been made that the update sub-request is completed by checking the running order value against the consumed running order value.

24 Claims, 8 Drawing Sheets

ASYNCHRONOUS ACCOUNT MODIFICATION

BACKGROUND

Loyalty and rewards programs are marketing structures where customers are provided with incentives for specific loyalty behavior. Often loyalty programs reward a customer's loyal buying behavior associated with a specific company and incentivize purchasing products or services through the company in order to accrue loyalty awards or incentives. Sometimes a customer may be rewarded with loyalty points or loyalty deals that may be associated with the customer's loyalty account. Such loyalty incentives may be stored in an electronic account, on a physical card, on a computer chip or using various other methods. Loyalty incentives, such as points or loyalty deals, may be used to purchase goods and services or redeem other rewards at a later point in time. For example, a redemption process may allow the customer to redeem a defined number of points or a loyalty deal for goods and services at a discounted rate or no additional charge.

Loyalty points and loyalty deals may have expiration dates associated with the loyalty reward. When a loyalty reward is not used within a predetermined amount of time (e.g., anywhere from one hour to multiple years), then the loyalty reward may expire and may not be usable by the customer after the expiration date.

DETAILED DESCRIPTION

A technology is provided for managing asynchronous expiration of loyalty incentives for an account. The terms "loyalty account" and "account" may be used interchangeably in this description. The account may have a plurality of subaccounts and the subaccounts may represent loyalty incentives associated with the account for a customer. For example, the loyalty incentives may be points, discounts or other loyalty rewards. The loyalty incentives earned by customers may have an expiration date. This means that points or incentives earned by a customer may expire after a specific time period has passed. For example, points earned by taking a customer survey may expire after a one or two year period. In contrast, points purchased by a customer may not expire unless a customer closes an account with the company.

The technology may serialize or sequence asynchronous update events and expiration events for accounts and subaccounts using a running order value and a consumed running order value. In one example, an update request may be sent from an account manager module to a subaccount changer module via an event channel. The account manager module may check a running order value for the account and the update request may have the running order value of '7', for instance. An expiration request may be sent to an account manager module from an expiration module along with a consumed running order value retrieved from a notification metadata data store that is '7'. The consumed running order value may be '7' because the update request from the account manager module has not yet completed. When the account manager module prepares to send the expiration request, the running order value may be incremented to 8. However, the consumed running order as received with the expiration request is still '7' because there is an in-transit update request. Thus, the consumed running order '7' is not the same as the incremented running order value '8', and therefore the expiration request fails. If the update request has completed before the expiration request is sent to the account manager module, then the running order value and the consumed running order value may be the same, and the expiration request may be sent by the account manager module to expire the subaccount.

Figure 1:
FIG. 1 is an example user interface page illustrating a customer's loyalty account.

FIG. 1 illustrates an example user interface page displaying a loyalty account 135, as accessed via a networked application. The user may have a customer account 110 with a company 105. The customer may have the ability to search 130 for products and services offered by the company that may be purchased by the customer. In addition, the page may illustrate a total number of loyalty incentives 140 owned by the customer. For example, the customer may have 600 reward points in a loyalty account and two loyalty incentives. These 600 points may be distributed across multiple subaccounts 150a-c. The subaccounts may also have an expiration time. For example, 300 points 150a may expire one month from now. The user interface page may also allow the customer to view different aspects of the loyalty program 115 or their account information 120.

A loyalty incentive 160a-160b may also be contained in a subaccount. FIG. 1 illustrates example incentives including a loyalty incentive of a 10% discount on electronics or a cash discount incentive toward clothing which may be contained in a subaccount besides points. The loyalty incentives may also have expiration times. For instance, the $25 incentive toward clothing 160b may expire in 6 months. In addition, a subaccount may contain both loyalty points and a loyalty incentive in one subaccount.

As suggested before, many types of loyalty incentives may be stored by a subaccount. Example loyalty incentives provided to customers may include loyalty points, credits, cash rewards, cash incentives, electronic downloads and/or loyalty discounts. Customers may earn points or discounts by purchasing a particular product item or service. A purchased item may be a physical product, such as a book or household item, or an electronic product, such as an e-book, software, music, a video, etc. Defined actions may also be taken by a customer to earn loyalty incentives. For example, a customer may earn loyalty incentives by filling out a feedback survey about a company's services, customer support, shipping, or other topics. Loyalty incentives may also be earned by referring friends and family to the company providing the loyalty incentives. A myriad of other desired actions may also be promoted by a company to enable a customer to earn loyalty incentives. When the actions or events result in earned loyalty incentives for a customer, the loyalty incentives earned by an action may be stored in newly created separate subaccount. Loyalty incentives, such as points, may also be purchased by customers using money, and these points may be used for later product purchases. Loyalty incentives purchased by a first customer can also be sent as a gift to a second customer.

When a customer purchases an item or service, the loyalty account may be updated. Then the subaccounts associated with the loyalty account may also be updated. For example, points may be removed from a subaccount or a discount may be consumed. However, updating multiple subaccounts synchronously (i.e., at the same time), may take a significant amount of time. This added time may create latency that is noticeable by a customer. Customers may also have a large number of subaccounts that are associated with the loyalty account, depending on the customer activity. In some cases, the customer may have hundreds or even a few thousand subaccounts that are associated with the loyalty account. This large number of subaccounts may be due to the number of items purchased, surveys taken, customer referrals provided, customer reviews submitted, videos watched and other loyalty actions taken by the customer.

Figure 2:
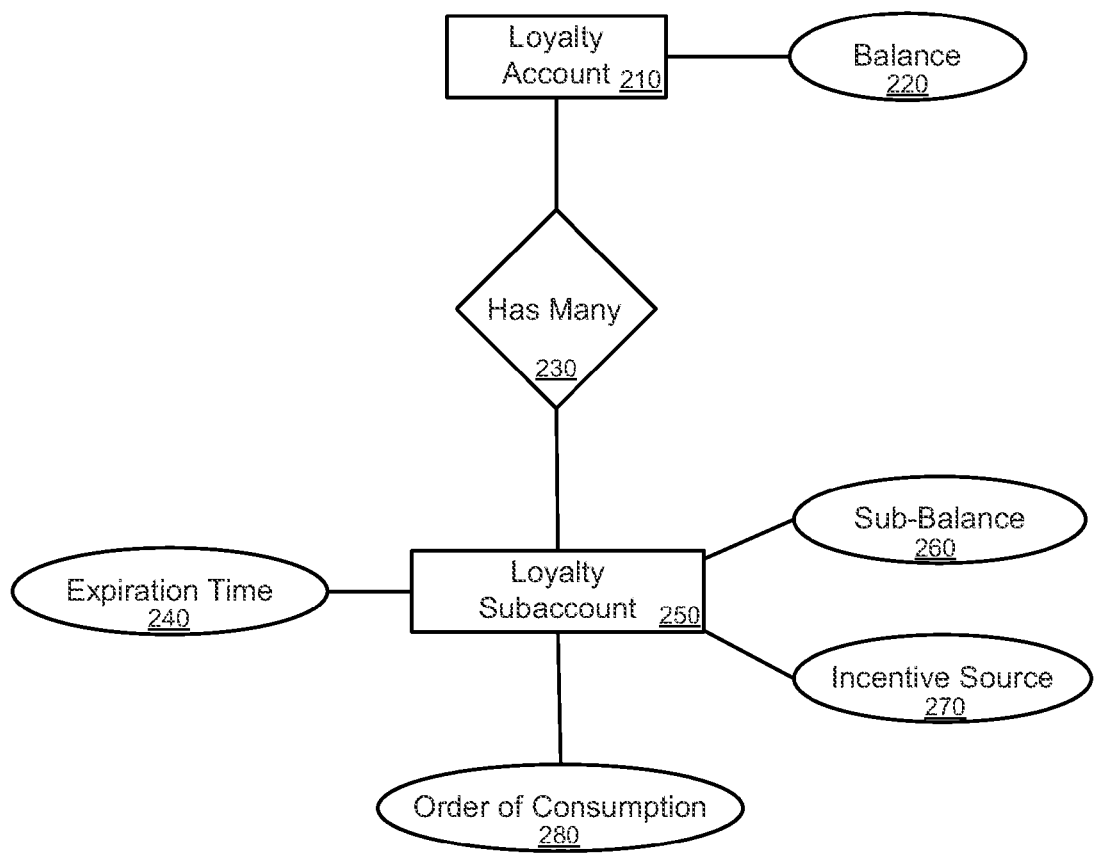
FIG. 2 illustrates an example entity-relation diagram for loyalty accounts, subaccounts and related data attributes.

FIG. 2 illustrates an example entity-relation (ER) diagram for loyalty accounts and subaccounts. A customer may have a loyalty account 210 that also has a balance 220. A balance may be a numeric balance or non-numeric loyalty incentive that exists in the loyalty account. For example, the loyalty balance may be a number of points or credits earned from being a loyal customer to a sponsoring entity or company. In addition, the loyalty balance may include other incentives such as discounts, promotional cash, giveaways and other discount promotion types.

The loyalty account 210 may have many 230 subaccounts. The subaccounts may be loyalty subaccounts 250 that have loyalty sub-balances 260. The terms "subaccount" and "loyalty subaccount" may be used interchangeably in this description. The loyalty subaccount may have an expiration time 240. The expiration time may be a set amount of time from the grant time that the loyalty reward was granted by an entity. For instance, a loyalty reward that was received by a customer may have an expiration time of one or two years from the grant date. Of course, any amount of time may be provided for the expiration of the loyalty incentives recorded by the subaccount. For instance, the expiration date may be a fixed time regardless of the grant time (e.g., the loyalty sub-balance expires by December 31 regardless). An expiration time may range from just a few minutes or hours up to many years. For example, if a user has 500 points in an account, the customer may have 200 points expiring in January and 300 points expiring in February. The expiration time 240 may include a calendar date, an hour, a minute, second and/or other time details about a time when the subaccount may expire.

Priority for consumption may be influenced by the time the loyalty incentives expire. For example, the points expiring first are desired to be consumed first when a purchase transaction occurs (as compared to points expiring later) to provide the best customer experience. Otherwise, a customer might be frustrated that the newest points are being consumed by purchase transactions while the customer's oldest points are simply expiring. When the loyalty incentives are consumed by a purchase, then the purchase may be attributed to the customer who is making the purchase with the loyalty incentives. For example, loyalty points in the subaccounts may be expired and a purchase made with points may be attributed to the points source (e.g., the customer) are desired to be consumed when a purchase transaction occurs to provide the best customer experience.

The loyalty subaccount 250 may also have an order of consumption 280 for the loyalty subaccounts. The order of consumption may be a sequential value using numbers or symbols to represent the priority order in which the loyalty subaccounts may be consumed. The subaccount with the highest order of consumption value may be placed last in the consumption list. Alternatively, an inverted ordering may be used where the highest order of consumption value is first. There may be a number of reasons for altering the consumption order for subaccounts (other than ordering by subaccount expiration order.) For example, there may be an ordering of subaccounts for accounting reasons where the account balance with smallest balance expires first. As another example, purchased points may be set to have the lowest priority for consumption, since purchased points may not necessarily expire. The order of consumption may also be based on the point type or how the point was obtained (e.g., from a third party vendor). Another ordering may prioritize points obtained with money or actual item purchases. In contrast, soft money points that are obtained from taking a survey or some other similar action may have a lower priority and be consumed first.

In another example, an entity that is selling goods may allow a user to accumulate loyalty incentives. The entity granting the points may be a physical or electronic retailer. The incentives may be granted directly from the retailer or incentives may be obtained from other entities providing the incentives via the retailer (e.g., a marketing entity, wholesaler, or a product supplier). For instance, incentives or points that are provided by a credit card company may be redeemed through the retailer. Thus, the subaccounts may also have an incentive source 270. This incentive source 270 may represent the entity granting the loyalty incentive.

Merchants who are selling items or services through an electronic retailer or a physical retailer may be a source of loyalty incentives. A merchant may start a loyalty point campaign that applies to certain items or services the merchant is selling to customers. For example, a merchant or a manufacturer may allocate $500,000 dollars in points to distribute to customers with purchases of the merchant's items through a retailer. These points from the merchant may be used to purchase other items or services through the retailer. In addition, the points may expire if the points are not used within a specific time frame. Then the expired points may be returned to the merchant for re-distribution to customers or in the form of cash.

Figure 3:
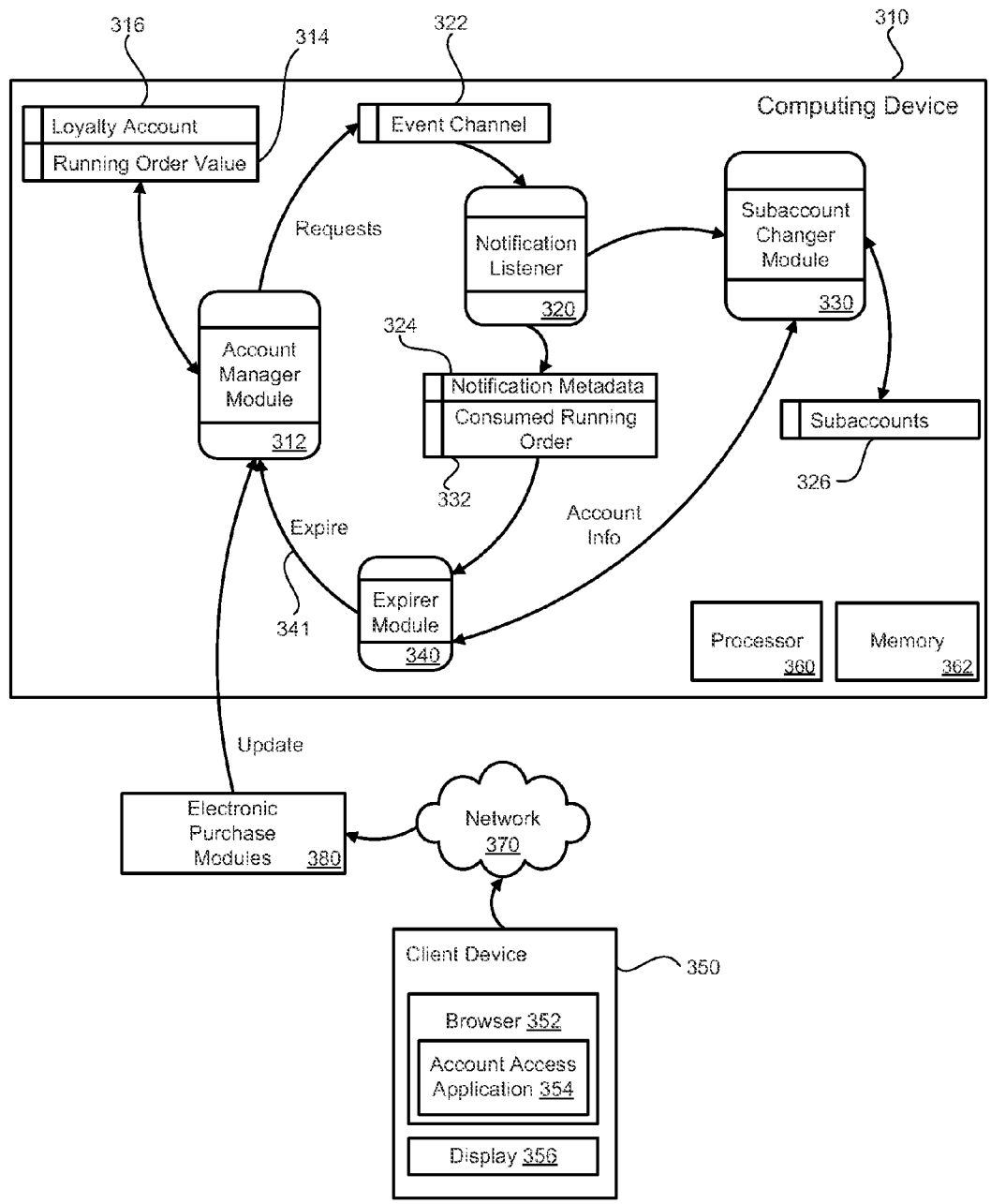
FIG. 3 is a block diagram illustrating an example system to manage subaccounts for a loyalty account.

FIG. 3 illustrates an example system for managing subaccounts 326 for a loyalty account 316. The system may control the asynchronous consumption and expiration of subaccounts with rewards incentives (e.g., points). More specifically, the system may manage expiring a subaccount 326 (e.g., subaccount value) using asynchronous notifications. The account value may be loyalty points, purchasing discounts and other similar account value. The system may asynchronously update a subaccount 326 (e.g., decrease points) or expire subaccount incentives (e.g., discounts) in order to provide an accurate account record to a customer who owns the loyalty account 316.

At any point in time when an attempt is made to expire a subaccount 326 through the loyalty account 316, there may be another request in-transit that is applicable to the subaccount 326. If an expiration request is applied while there is another pending in-transit request (e.g., an update request), the expiration request may cause an erroneous transaction or fail. Thus, an expiration request for a subaccount 326 may be managed so that a subaccount 326 does not obtain an erroneous value or encounter a transaction error during asynchronous subaccount updates.

When a customer updates a loyalty account 316 by making a purchase, then the loyalty account 316 may be modified. An account manager module 312 may receive an update request to update the loyalty account 316. The account manager module 312 may update the loyalty balance or account balance for the loyalty account 316 in response to the update request. A running order value 314 may also be associated with the loyalty account 316. The running order value 314 assigned to requests may be used to set an order in which requests are consumed or serviced. In other words, the running order value 314 may be a sequence number or sequence character that is incremented when a request is created and the running order value 314 may be associated with the loyalty account 316 and used by requests for the subaccounts 326. In other words, a loyalty account 316 may have an individual running order value 314 that is globally used with requests and transactions for the subaccounts 326 associated with the loyalty account 316. Dispatched update requests (e.g., notifications) that are related to the loyalty account 316 may include the running order value 314 for that loyalty account 316. In an alternative configuration, the subaccount 326 may have a running order value associated with a subaccount 326.

The account manager module 312 may be located on a computing device 310. An example of a computing device 310 may be a server or another similar electronic processing device. For example, the server may be a single server, a distributed server environment, a server farm, or any computing device or group of computing devices that may serve requests from other computing devices or programs. The computing device 310 may contain a processor 360, a memory 362, communication modules and desired computing peripherals.

Whenever a request is made through the account manager module 312 (e.g., updating a balance), the running order value 314 may be read from a data store (822 in FIG. 8) where the running order value 314 is stored. Then the running order value 314 may be incremented and written back to the running order value 314 on the data store. The term "data store" may refer to any device or combination of devices capable of storing, accessing, organizing and/or retrieving data, which may include any combination and number of data servers, relational databases, object oriented databases, simple web storage systems, cloud storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media.

In one example, the running order value 314 may be read from the data store (822 in FIG. 8) without concurrency controls. Alternatively, the running order value 314 may use exclusive hardware or software concurrency controls to ensure that another process and/or service may not read and/or write to the running order value 314. For example, software or hardware locks may be used to control concurrency access to the running order value 314.

In one example, the running order value 314 may be incremented by one when a request is made or a transaction is started by an account manager module 312. Other value increments may also be used, such as incrementing the running order value 314 by 2, 5, 10 or other useful values. Alternatively, the running order value 314 may be started at a maximum value and decremented down. Other sequential values may be used for the running order value 314, such as characters in a Unicode or ASCII character set, as long as the set has known sequential order that may be compared to other values and the values may be tracked. The running order value 314 that is being updated may be used as part of a control design to avoid applying an expiration request while an update request is in process.

Requests that may be applicable to the loyalty account 316 or subaccounts 326 may also have timestamps associated with the request. Timestamps may be used to help distinguish the order of the requests or transactions. However, time stamped requests may collide because the timestamps may not have a high enough resolution and the timestamps may collide in the same millisecond. Thus, the running order value 314 may more accurately distinguish two requests or transactions from each other. In this sense, the running order value 314 may be used for optimistic locking and may be used to stop an expiration request from completing when other requests with an earlier running order are being fulfilled.

Requests from the account manager module 312 may be sent to an event channel 322 which may be configured to communicate requests and events between the account manager module 312 and a notification listener 320. In one configuration, the event channel 322 may be a FIFO (First In First Out) queue that temporarily stores the requests. Examples of events that may pass through the event channel 322 may include update requests, expiration requests, status requests, delete requests, modify requests, read requests and so forth. The terms "request", "event" and "transaction" may be used interchangeably in this description.

The notification listener 320 may receive requests or transactions from the account manager module 312. Such requests (i.e., transactions or events) may be sequentially ordered. The notification listener 320 may serialize the communication requests based on the running order value 314 (e.g., sequencing values). As described before, the running order value 314 may be a numbered order or another sequential ordering associated with the loyalty account 316. Once the notification listener 320 has serialized the requests (e.g., events or transactions) on the running order value 314, then the requests may be processed. For example, an update request may deduct points from subaccount balances or may consume discounts provided in the subaccounts 326.

If desired, the ordering may be performed using a locking framework or other event locking tools. Locking tools allow dispatched requests to be consumed in the order they were dispatched. If a relatively large amount of transactions are expected to be passing through the event channel 322 then a locking tool may be used. Further, if the event queue is a distributed event queue, then locking may aid in serializing the queue correctly. For example, the notification listener 320 may use, host or interface with the locking tools. The notification listener 320 may also sequentially order update requests and expiration requests using the running order value 314. If a request is an update request, then the update request may consume a portion of the subaccount or the entire subaccount 326. For example, a subaccount 326 containing points may have a portion of or the entire balance of the points consumed. If the subaccount 326 contains a discount, then the discount may be expired. When an expiration request is sent to expire a balance, an in-process update or a balance change may or may not be in the event channel 322 (e.g., a notification pipeline) to consume a particular subaccount 326. Therefore, an incorrect transaction may occur if the expiration request is applied before the update request is completed.

A subaccount changer module 330 may receive update requests and modify the subaccounts 326 based on the update requests. The update requests may include modifying a balance of a subaccount 326 (e.g., increasing or decreasing) or marking a discount held by a subaccount 326 as consumed. When an update request is completed, a consumed running order value 332 may be updated by the notification listener 320. In one example, the consumed running order value 332 may be stored in a notification metadata data store 324. The consumed running order value 332 may be a value which represents that requests or transactions for a loyalty account 316 have been processed up to running order value N. For example, if the consumed running order value is 7, then request 7 has been completed but request 8 has not been completed.

An expirer module 340 may generate an expiration request 341 to be ultimately sent to the subaccount changer module 330 via the account manager module 312. In one example, the expirer module 340 may request a deduction of the points from the loyalty account 316 using the account manager module 312. Next, the expirer module 340 may ask the account manager module 312 for an optimistic lock on the running order value 314 for the expiration request.

The expirer module 340 may obtain the consumed running order 332 from the notification metadata data store 324. Then the expirer module 340 may send an expiration request 341 (i.e., a call) to the account manager module 312 to consume loyalty incentives from the loyalty account 316 and related subaccounts 326.

The expiration request 341 for the subaccount 326 may fail when the consumed running order value 332 and the running order value 314 are determined to be different. Failure to acquire this lock may mean that there is an in-flight (i.e., in-process) transaction that is being applied to a subaccount 326 of the loyalty account 316. When the running order value 314 and consumed running order value 332 are the same, then the expiration request 341 may be sent on to the event channel 322. The subaccount changer module 330 may then receive the expiration request 341 from the notification listener 320 and may apply the expiration request 341 to the subaccount 326 which will mark a portion of the subaccount 326 or the entire subaccount 326 as expired. Once a notification about the subaccount expiration reaches the client device 350 through a network 370, the subaccount 326 may already be closed.

Checking the running order value 314 against the consumed running order value 332 may create some inefficiency where a loyalty account 316 has comparatively high traffic for the loyalty account 316 and subaccounts 326. In a high traffic case, the expirer module 340 may wait to acquire a lock and waiting to acquire a lock may result in bigger expiration delays. As a result, the notification delay to the client device 350 may be high in some high traffic situations. An example of a high traffic loyalty account 316 with subaccounts 326 may be a loyalty account 316 where loyalty incentives and/or points are being consumed with a relatively high frequency or even continuously being consumed. However, a majority of loyalty accounts 316 are unlikely to experience a significant delay due to the expiration of subaccounts 326.

In a severe case, an optimistic lock may be unobtainable due to a loyalty account's high rate of activity. Such a case indicates that the customer may be consuming loyalty incentives at a high rate. This high frequency use or consumption may also mean that a retailer is engaging the customer well and making money. Thus, this technology prioritizes the consumption of points over the strict expiration of points when an optimistic lock is unobtainable.

The expirer module 340 may send expiration requests 341 when a particular loyalty account 316 or subaccount 326 is accessed, or the expirer module 340 may receive a message from another processing module that a specific subaccount 326 is to be expired. Then the expirer module 340 may try to expire that subaccount 326. The expirer module 340 may be notified to expire accounts by a time activated process or service (e.g., a chron. job or scheduled task) that is frequently checking for expired subaccounts 326. Alternatively, a subaccount 326 may report that an expiration time has arrived when the customer first accesses their loyalty account 316. This means that an expiration request 341 may be initiated from another module in the system.

A subaccount expiration date may be calculated based on the day that the subaccount 326 was initiated or another arbitrary date may be set. For example, a one year anniversary date or a pre-determined date offset from the subaccount initiation date may be the subaccount expiration date. For example, the expiration date may be 3 or 6 months in the future from the subaccount creation. The expirer module 340 may also get the subaccount information and/or balance from the subaccount changer module, if desired. The expiration request 341 may have an associated consumed running order value 332 that is sent with the expiration request 341. The expiration request 341 may expire a portion of or an entire subaccount balance, including loyalty incentives or promotional offers associated with the subaccount 326.

In contrast to asynchronous updating, a synchronous update of the loyalty account 316 and the subaccount 326 may cause significant delays in the account updates getting reflected to the client device 350. These delays may be frustrating and confusing to a customer. Hence, updating the subaccount's consumed incentives may be more effective when done asynchronously (i.e., offline). However, updating the subaccounts 326 asynchronously might otherwise result in account balance problems when expiring a subaccount and this technology helps avoid such problems.

Separate running order values 314 and separate consumed running order values 326 may be associated with credit and debit requests for a loyalty account 316 in order to increase the probability of acquiring the lock. For example, one running order value may apply to the debit requests and a second running order value may apply to credit requests. Alternatively, a running order value 314 may be provided just for debit transactions and may not apply for credit transactions.

In another example configuration of the technology, the subaccount changer module 330 or the notification listener 320 may check the running order value 314 against the consumed running order value 326. In an expiration request failure situation, the subaccount changer module 330 or notification listener 320 may store the incoming expiration request in a temporary queue until the update request finishes. Then the expiration request may be sent out once the update request is finished.

Figure 7:
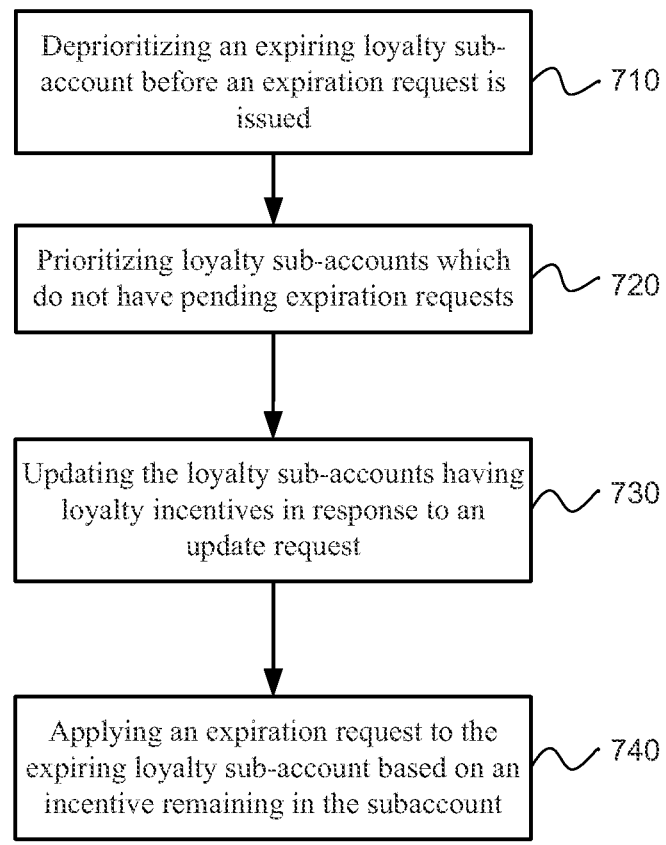
FIG. 7 is a flowchart illustrating an example method for asynchronously expiring a loyalty subaccount using subaccount prioritization.

The loyalty account, running order value 314, consumed running order value 332, event channel 322, notification metadata data store 324 and subaccount 326 may be stored in separate data stores or a single data store 922 (FIG. 7).

Certain processing modules may be discussed in connection with this technology. For example, the account manager module 312, notification listener 320, expirer module 340 and subaccount changer module 330 may be services. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide ongoing access to the module or the third party access may be based on a per transaction access where the third party pays for specific transactions that are provided and consumed.

A client device 350 may access the loyalty account 316 and display loyalty incentives (e.g., points) for the loyalty account 316. This customer access through the client device 350 may happen when a purchase of item or service occurs. The purchase of items and services may be processed through electronic purchase modules 380 that are accessed through a network 370. For example, the customer may use a browser 352 that has an account access application 354 that allows the customer to access an electronic store to consume the loyalty incentives using the loyalty account 316. The browser 352 and any account access applications 354 may be viewed through a display 356 on the client device 350. The client device 350 may be a device such as, but not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system, or any device with a display that may receive and present the account.

This technology may also allow subaccounts in an account to be correctly expired without locking a subaccount. Locking an expiring subaccount before an expiration request is sent may provide a correct end result for the subaccount, but the account information for the customer may not be available during a period when one or more subaccounts are locked. As a result, the customer may not know what the account's status is (i.e., how many points or loyalty incentives are available) while the subaccounts are locked and this may create an undesirable customer experience. Thus, avoiding locking the subaccounts can create a better overall customer experience by allowing the account status to have a higher availability for the customer.

A number of example expiration use cases will now be described for the technology. The use cases described in the following tables assume that a customer has 100 loyalty points broken into two subaccounts with separate balances of 40 points expiring on January $1^{st}$ and 60 Points expiring on February $1^{st}$. By default, the subaccount consumption order may be the consumption of the earliest expiring subaccounts first. This allows customers to have the opportunity to consume points before they expire.

Table 1 illustrates a simple use case where 50 points are deducted from two subaccounts. The running order tracks the update request as number 7 and when the update request is completed, the consumed running order moves from 7 to 8.

TABLE 1

| Time Stamp | Request | Loyalty Account | Running order | Event Channel | Consumed Running order | Sub-acct. 1 balance | Sub-acct. 2 balance |
| --- | --- | --- | --- | --- | --- | --- | --- |
| T1 | -50 | 100 | 7 | Empty | 7 | 40 | 60 |
| T2 | Empty | 50 | 8 | Deduct 50 | 7 | 40 | 60 |
| T3 | Empty | 50 | 8 | Empty | 8 | 0 | 50 |

Table 2 illustrates an optimistic lock use case. In this case, the points in subaccount 1 are being expired. The running order tracks the expiration request as number 7 and when the expiration request is completed, the consumed running order moves from 7 to 8.

TABLE 2

| Time Stamp | Request | Loyalty Account | Running order | Event Channel | Consumed Running order | Sub-acct. 1 balance | Sub-acct. 2 balance |
| --- | --- | --- | --- | --- | --- | --- | --- |
| T1 | Expire 40 S1 7 | 100 | 7 | Empty | 7 | 40 | 60 |
| T2 | Empty | 60 | 8 | Expire 40 B1 7 | 7 | 40 | 60 |
| T3 | Empty | 60 | 8 | Empty | 8 | 0 Expired | 60 |

Table 3 illustrates a request failure use case. In this example, the running order and the consumed running order are compared and a determination is made that the expiration request will not be dispatched or completed because there is another request or transaction in-transit. Thus, the expiration transaction fails. Specifically, a 20 point request or transaction was in-transit and as a result the 40 point expiration is not applied. The expiration request may be sent again once the latest update request has been consumed to expire the subaccount with the remaining 20 points.

TABLE 3

| Time Stamp | Request | Loyalty Account | Running order | Event Channel | Consumed Running order | Sub-acct. 1 balance | Sub-acct. 2 balance |
| --- | --- | --- | --- | --- | --- | --- | --- |
| T1 | -20 | 100 | 7 | Empty | 7 | 40 | 60 |
| T2 | Expire 40 S1 7 (Transaction failure since 7 != 8) | 80 | 8 | Deduct 20 | 7 | 40 | 60 |
| T3 | Empty | 80 | 8 | Empty | 8 | 20 | 60 |
| T4 | Expire 20 S1 8 | 80 | 8 | Empty | 8 | 20 | 60 |
| T5 | Empty | 60 | 9 | Expire 20 S1 8 | 8 | 20 | 60 |
| T6 | Empty | 60 | 9 | Empty | 9 | 0 Expired | 60 |

Figure 4:
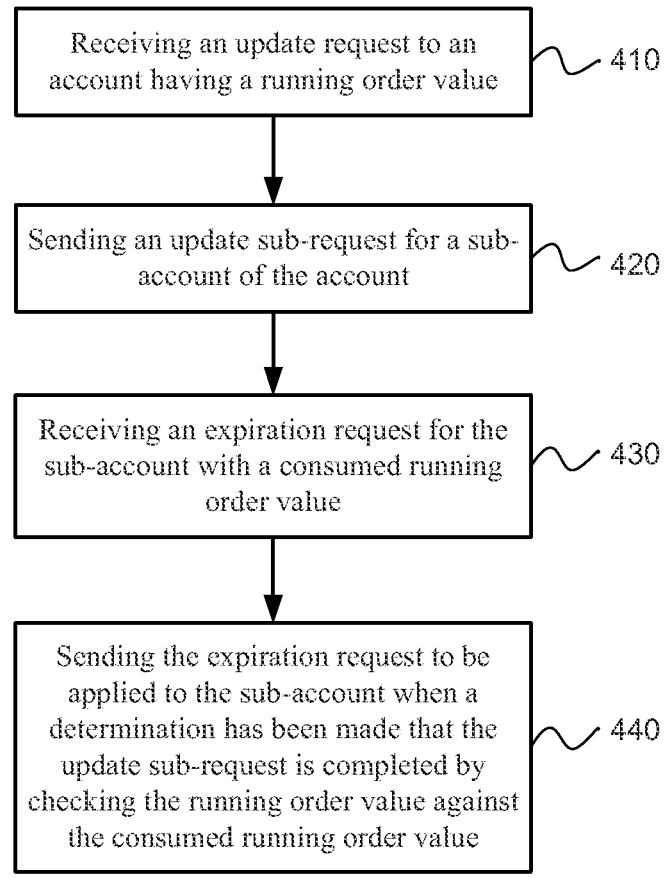
FIG. 4 is a flowchart illustrating an example method for asynchronously modifying a plurality of subaccounts.

FIG. 4 illustrates a flowchart of a method for asynchronously modifying a plurality of subaccounts. The subaccount may store a number of loyalty incentive types. For example, the loyalty incentives may be, but are not limited to, loyalty points, discount transactions, rebate transactions, merchant cash, cash incentive transactions, incentive merchandise (e.g., free merchandise, such as buy 5 products and get one free) and other private or public currency transactions. If a customer has loyalty points then these loyalty points may be used to purchase goods and services or receive other loyalty incentives. The goods and services may be purchased via a retail store (e.g., an electronic retail store) using a loyalty account, a loyalty card or another loyalty recording device.

An update request for an account having a running order value may be received by an account manager module, as in block 410. The running order value may be incremented for the account when a request is created in or sent from the account balance manager. For example, the account may have an account balance. So, the account balance manager may send an update request for the account balance. The account balance manager may then increment the running order value by one and may save the value back to the running order's data storage. The running order value may not have a concurrency control or exclusivity lock applied to the running order value. However, a hardware or software concurrency control may be applied, if desired.

An update sub-request may be sent for updating a subaccount of the account, as in block 420. The subaccount may be updated by updating a balance of loyalty points or another loyalty incentive in the subaccount. For example, the account manager module may send an update to the event channel. The event channel may be a communication channel that does not lose channel packets or requests and transactions sent to the channel. An event channel may even include a completeness protocol to guarantee that dispatched requests and transactions reach the event channel. Examples of a communication channel may be created in various web development environments such as: AMP (Apache/MySQL/Perl), SNS (Simple Notification Service), use of a landing zone, text messaging, email, etc.

An expiration request for the subaccount may be received and the expiration request may include a consumed running order value, as in block 430. The consumed running order value may represent completed requests using a sequential numerical or symbolic value. When a request is completed, the consumed running order value is incremented by one step. For example, if an update request has a running order number of seven (7) then the consumed running order may be seven (7) when the update request starts and is not yet completed. Once the update request completes, then the consumed running order may be incremented by one to a value of eight (8).

The expiration request may be sent to an account balance manager from an expirer module. However, the expiration request will not be dispatched for application to the subaccount until a determination has been made that the update sub-request has completed by checking the running order value against the consumed running order value, as in block 440. In other words, the expiration request may be sent when the running order value and the consumed running order value are the same. This means that any update request that was previously being processed has now completed. The expiration request may then be sent to the subaccount managing module via the notification listener to be applied to the subaccount. The subaccount that is the target of the expiration request may be marked closed or deleted when the expiration request is completed.

In one example configuration, the expiration request may be rescheduled when the running order value and the consumed running order value are different. This process may be broken down into multiple sub-parts where the expiration request first fails and the expirer module is notified of the failure. The expirer module may then put the expiring account into a waiting list or queue where the expiring account will wait for a predetermined amount of time before another expiration request is sent from the expirer module. For example, the delay for resending an expiration request may be set to be anywhere from a few milliseconds up to 24 hours of delay. The expiration request may be re-sent at the end of the predetermined amount of time (i.e., the delay period).

The present technology may also manage store value balances. Such store value balances are numeric balances representing money in a subaccount for a customer. For instance, an electronic retailer may take payment for a purchased item in advance at purchase time and not at the time of shipment. If the purchased item is not actually shipped to the customer then the money in the form of points may be returned to the customer. Further, a point may be equal to one unit denomination of money. For example, 10 dollars may be equal to 1000 points that are stored in a subaccount. Similarly, a customer may load or transfer money from a bank account to an electronic retailer and this money may be stored in subaccounts. The customer may then buy items from the electronic retailer using the money stored in the customer's subaccounts. Using a loyalty account and subaccounts with stored money to purchase items and services may result in much lower transaction costs than credit cards or similar banking instruments. This is because the customer may receive a discount on each account transaction charge because the retailer does not have to pay the credit card fees often charged to the retailer. Such store value balances may expire when a customer closes an account, transfers the money in an entire subaccount to a bank or takes another action that will empty the subaccount. In this sense, an electronic retailer may conveniently store, manage and expire value balances for the customers.

Figure 5:
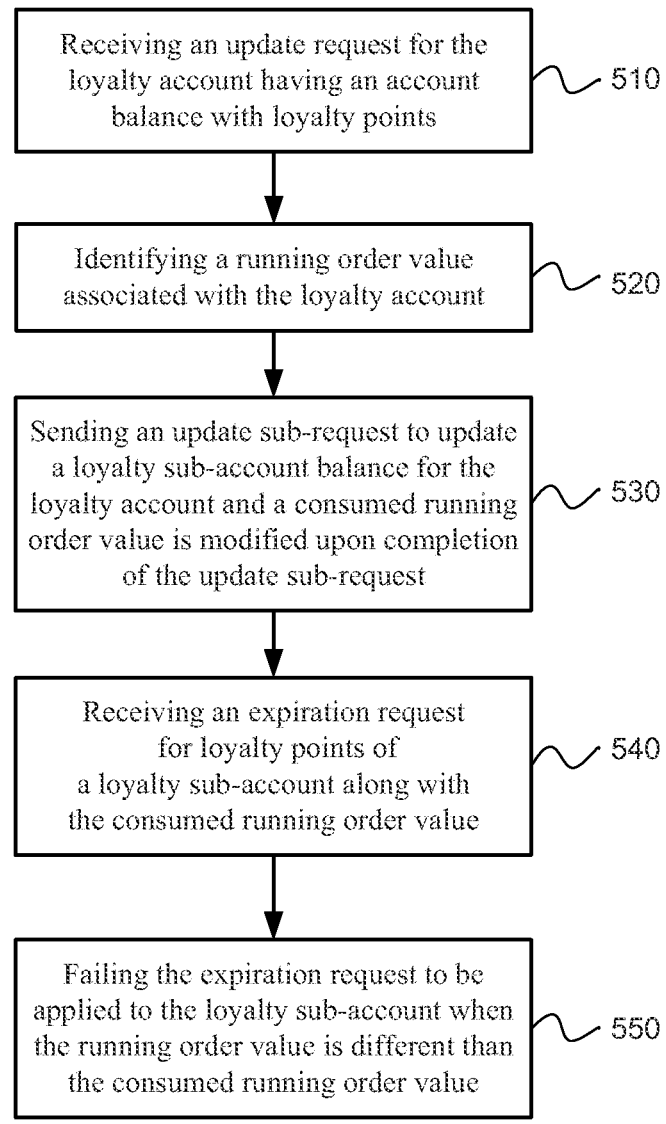
FIG. 5 is flowchart illustrating an example method for asynchronously modifying subaccounts from a subaccount changer module.

FIG. 5 illustrates a method for asynchronously modifying a loyalty account having a plurality of loyalty subaccounts. The method may include receiving an update request for the loyalty account having an account balance with loyalty points, as in block 510. As described before loyalty points may be earned by certain actions including, but not limited to, playing a game, watching a movie, purchasing a book, purchasing downloadable software, taking a survey, providing a product review, purchasing a specific physical product (e.g. retail items), or installing certain applications on a computing device. For example, a customer may receive 10 to 20 points for any of the actions just described above. The points may be used to buy other physical or digital items. These points may be considered a form of rebates or the points may simply be loyalty incentives.

A running order value associated with the loyalty account may then be identified, as in block 520. A running order value may be a value that tracks requests created by an account manager module. For example, the running order value may be read from the running order value data store and may be incremented when a request is made, such as an update request or expiration request. The running order value may also be associated with the update request. Whenever a subaccount is updated, an order may be imposed on the requests. An update sub-request may be sent to update a loyalty subaccount balance for the loyalty account, as in block 530. A consumed running order value may be modified upon completion of the update sub-request. The consumed running order value may be used to track the last completed request, and the consumed running order value may be stored in a notification metadata store.

An expiration request for loyalty points of a loyalty subaccount may be received along with the consumed running order value, as in block 540. The expiration request may be received from an expirer module.

The expiration request may fail and may not be sent to the loyalty subaccount when the running order value is different than the consumed running order value, as in block 550. In other words, the expiration request may be fail or be blocked once the running order value and consumed running order value check has determined that the running order value and the consumed running order value are different or not the same. Later, an expiration request dispatch can be re-authorized, then the account manager module may allow the expiration request to be sent to the event channel when the running order value and the consumed running order value are the same. Requests in the event channel may be consumed by the notification listener and the request may be identified as an expiration request to expire the subaccount.

Using the method described for FIG. 5 may help avoid exposing a customer to a wrong or incorrect balance. Applying an optimistic lock on the running order value allows an account manager to determine if another request is in process (e.g., in the event channel or being applied to a data store) for a subaccount. When another request is in-process when an expiration request is dispatched, then being able to detect this conflict allows corrective action to be taken. In other words, the technology expects the running order value to be the same as a consumed running order value for an expiration request to proceed. When unexpected values are found that do not match when comparing the running order value to the consumed running order value, then the expiration requests may fail.

Figure 6:
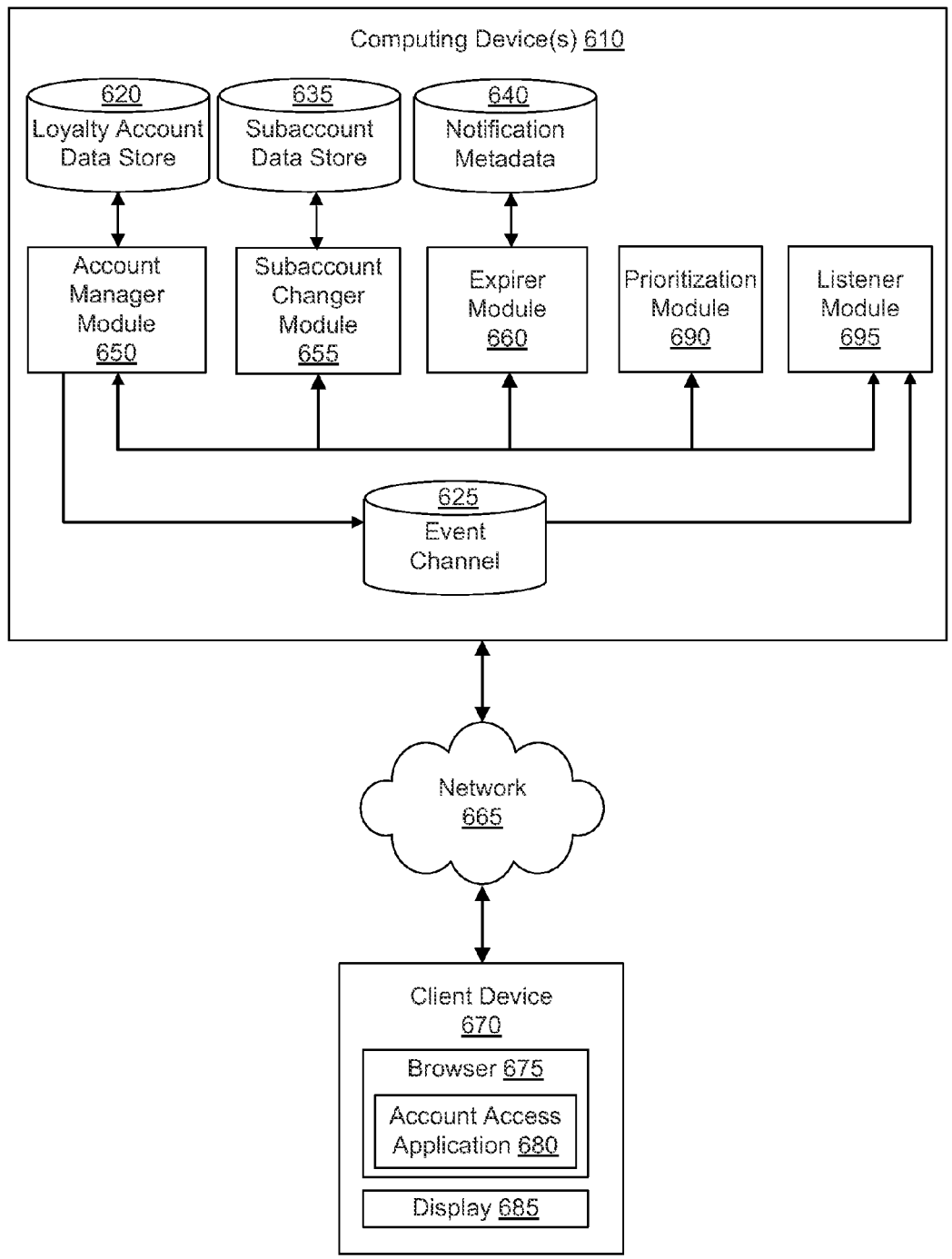
FIG. 6 is an example system for asynchronously expiring an account value using subaccount prioritization.

Expiration of the subaccounts can also be performed using the components of this technology to prioritize the subaccounts in a way that optimistic lock checking is avoided. FIG. 6 illustrates a system using a computing device 610 for asynchronously expiring an account value using subaccount de-prioritization. A loyalty account 620 may have a loyalty incentive status or loyalty balance. The loyalty account 620 may be associated with a plurality of subaccounts 635, where a specific loyalty incentive may be associated with the subaccounts 635. The subaccounts 635 may also have loyalty sub-balances.

An account manager module 650 may update the loyalty balance for the loyalty account 620 in response to update requests. A subaccount changer module 655 may receive requests from the account manager module 650 and modify the subaccounts 635 based on the requests. The subaccount 635 may also have a priority for consumption.

An expirer module 660 may generate an expiration request to be sent to the subaccount changer module 655 via event channel 325, the listener module 695 and the account manager module 650. In addition, a prioritization module 690 may deprioritize an expiring subaccount 635 before an expiration request is issued. In other words, the prioritization module 690 may be used to change the order of consumption for the subaccounts. The prioritization module 690 first deprioritizes a subaccount 635 so that the subaccount may not be affected by update requests, expiration requests or any other requests. By deprioritizing the expiring subaccount 635, any expenditure of points for the loyalty account 620 may use the points in the expiring subaccount 635 if and only if the customer is consuming the entire balance of the account points.

This de-prioritization allows the expirer module 660 to send an expiration request to the subaccount changer module 655 to expire a subaccount 635 without any locks. If the de-prioritized subaccount 635 was already consumed when the expiration request is received, then the expiration request or transaction may fail. When a failure occurs, the expirer module 660 may be informed that there is no need for expiration of the subaccount at that point.

De-prioritization or switching the priority of the subaccounts means that the points may be expired properly unless the customer has entirely used up the points in the account. By switching the priority, the non-expiring points may be used first. Thus, a subaccount may be expired unless the points are entirely consumed for an account, at which point no expiration may be needed. Using the re-prioritization, the customer does not know that subaccounts have been consumed out of order because the expiring subaccount may be expired immediately after consumption transactions have taken place. While this re-prioritization strategy may cause a subaccount to be consumed outside the prioritized rules of a consumption strategy, the benefit is that a correct account balance is achieved without using optimistic locking.

FIG. 6 further illustrates that a client device 670 may be used to view the customer's account using a display 685 to depict account data accessed via a network 665. An account access application 680 may operate in the browser 675 or independently on the client device. The loyalty account 620, loyalty subaccount 635, notification metadata 640 and the event channel 625 may each be located in a separate data store within the computing device 610. Alternatively, the data in the loyalty account 620, loyalty subaccount 635, notification metadata 640 and the event channel 625 may be located in a single data store. In addition, the data stores may be located in computing devices that are separate from the illustrated computing device 610 and the data stores may be accessed using a network.

FIG. 7 illustrates a flowchart for an example method for asynchronously expiring a loyalty subaccount. The method may include deprioritizing an expiring loyalty subaccount before an expiration request is issued, as in block 710. The loyalty subaccounts which do not have pending expiration requests may be prioritized, as in block 720. In other words, the loyalty subaccounts may be ordered so that non-expiring subaccounts are consumed first and the expiring account is consumed last. Alternatively, the non-expiring subaccounts may use the prioritization of the subaccounts existing before the expiring loyalty account was deprioritized, so no additional prioritization may be applied. This de-prioritization and/or prioritization may take place using a prioritization module to change a priority order of the loyalty subaccounts.

The loyalty subaccounts having loyalty incentives may then be updated in response to an update request, as in block 730. An expiration request may then be applied to the expiring loyalty subaccount based on an incentive remaining in the subaccount, as in block 740. For example, if the subaccount to be expired started with 40 points but now 20 points remain in the subaccount after some updates have completed, then the expiration request can expire the 20 points. In another example, if the customer had two free merchandise items but there is one remaining in the expiring account, then the expiration request can expire the one remaining free merchandise item.

A situation may occur where the customer has entirely consumed their loyalty points or loyalty incentives. In this case, the deprioritized expiring loyalty account may have already been consumed prior to receiving the expiration request. Accordingly, the expiration request may fail when the expiring loyalty subaccount has already been consumed. The reason the expiration request has failed may be reported back to the expirer module so the expiration transaction will not be re-sent or re-initiated. For example, the subaccount changer may report that the expiration request failed because the subaccount was marked as completely consumed. In this case, no expiration request retries will be sent.

A number of example prioritization use cases will now be described for the technology. The use cases described in the following tables assume that a customer has 100 loyalty points broken into two balances of 40 points expiring on January $1^{st}$ and 60 Points expiring on February $1^{st}$.

Table 4 illustrates management of subaccount expiration by reordering subaccount priorities. Specifically, an expiration request is sent for expiring points in subaccount one and the subaccount priorities are switched before the expiration is dispatched. The expiration request is received and the 40 points are expired from the subaccount one (S1).

TABLE 4

| Time Stamp | Request | Loyalty Account | Running order | Event Channel | Consumed Running order | Sub-acct. 1 balance | Sub-acct. 2 balance |
|---|---|---|---|---|---|---|---|
| T1 | Empty | 100 | 7 | Empty | 7 | 40 (P1) | 60 (P2) |
| T2 | Empty | 100 | 7 | Empty | 7 | 40 (P2) | 60 (P1) |
| T2 | Expire 40 S1 | 100 | 7 | Empty | 7 | 40 | 60 |
| T3 | Empty | 60 | 8 | Expire 40 S1 | 7 | 0 | 60 |
| T4 | Empty | 60 | 8 | Empty | 8 | 0 Expired | 60 |

Table 5 illustrates an in-transit message use case with subaccount switching. Before the subaccount expiration message is sent, the priorities of subaccount 1 and subaccount 1 are switched. An in-transit update request is illustrated for 20 points. However, due to the subaccount priority reordering before the expiration request for subaccount 1 was sent, the 20 points were consumed from highest priority subaccount (P2) which is now subaccount 2. Then the expiration of the subaccount (S1) proceeds without any optimistic locking because (S1) is the lowest priority (P2) and the expiration does not affect the points' consumption.

TABLE 5

| Time Stamp | Request | Loyalty Account | Running order | Event Channel | Consumed Running order | Sub-acct. 1 balance | Sub-acct. 2 balance |
|---|---|---|---|---|---|---|---|
| T1 | Empty | 100 | 7 | Empty | 7 | 40 (P1) | 60 (P2) |
| T2 | Empty | 100 | 7 | Empty | 7 | 40 (P2) | 60 (P1) |
| T3 | −20 | 100 | 7 | Empty | 7 | 40 | 60 |
| T2 | Expire 40 S1 | 80 | 8 | Deduct 20 | 7 | 40 | 60 |
| T3 | Empty | 40 | 9 | Expire 40 S1 | 8 | 40 | 40 |
| T1 | Empty | 40 | 9 | Empty | 9 | 0 | 40 |

Table 6 illustrates a subaccount priority reordering and overuse of points use case. In this case, 20 points were available after 80 points were consumed. Thus, 20 points were expired even though the expiration request called to have 40 points expire.

TABLE 6

| Time Stamp | Request | Loyalty Account | Running order | Event Channel | Consumed Running order | Sub-acct. 1 balance | Sub-acct. 2 balance |
|---|---|---|---|---|---|---|---|
| T1 | Empty | 100 | 7 | Empty | 7 | 40 (P1) | 60 (P2) |
| T2 | Empty | 100 | 7 | Empty | 7 | 40 (P2) | 60 (P1) |
| T3 | −80 | 100 | 7 | Empty | 7 | 40 | 60 |
| T2 | Expire 40 S1 | 20 | 8 | Deduct 80 | 7 | 40 | 60 |
| T3 | Empty | 0 | 9 | Expire 20 S1 | 8 | 20 | 0 |
| T1 | Empty | 0 | 9 | Empty | 9 | 0 | 00 |

Figure 8:
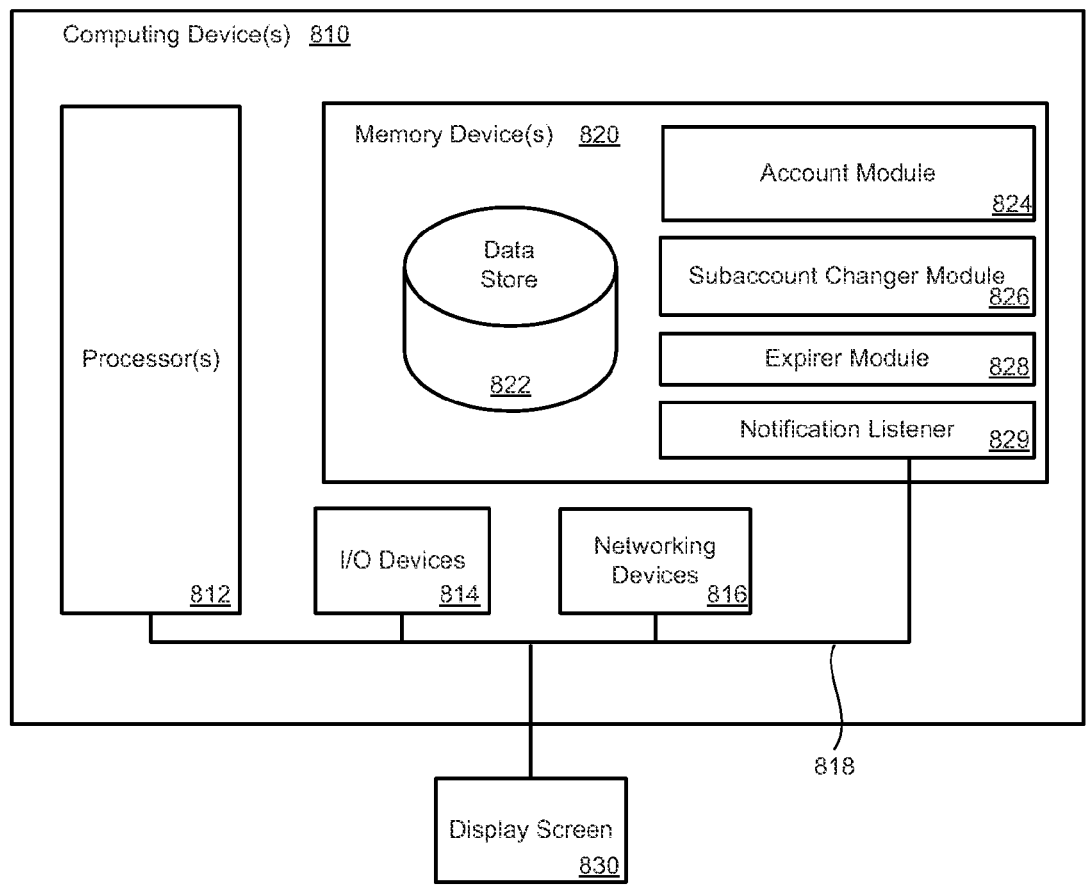
FIG. 8 illustrates an example computing device on which modules of this technology may execute for asynchronous account modification.

FIG. 8 illustrates a computing device 810 on which modules of this technology may execute. A computing device 810 is illustrated on which an example of the technology may be executed. The computing device 810 may include one or more processors 812 that are in communication with memory device 820. The computing device may include a local communication interface 818 for the components in the computing device. For example, the local communication interface may be a local data bus and/or any related address or control busses as may be desired.

The memory device 820 may contain modules that are executable by the processor(s) 812 and data for the modules. Located in the memory device 820 are modules executable by the processor. For example, an account module 824, a subaccount changer module 826, an expirer module 828, a notification listener module 829 and other modules may be located in the memory device 820. The modules may execute the functions described earlier. A data store 822 may also be located in the memory device 820 for storing data related to the modules and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen 830 that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local communication interface 818 may be used as a network to facilitate communication between any of the multiple processors and multiple memories. The local communication interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method for asynchronously modifying a loyalty account having a plurality of loyalty subaccounts, comprising:
    receiving an update request for the loyalty account having an account balance with loyalty points, the update request being received at an account manager module and initiating a single transaction to update the account balance;
    identifying, at the account manager module, a running order value associated with the loyalty account, using a processor, the running order value being associated with the single transaction and indicating a number of update sub-requests received;
    sending an update sub-request from the account manager module to a subaccount changer module to update a loyalty subaccount balance for the loyalty account, and a consumed running order value is modified upon completion of the update sub-request, the consumed running order value indicating a number of update sub-requests completed;
    receiving an expiration request at an expiration time at the account manager module for loyalty points of a loyalty subaccount along with the consumed running order value, the expiration request being received from an expirer module; and
    failing the expiration request to be applied to the loyalty subaccount at the account manager module when the running order value is different than the consumed running order value, indicating that the single transaction to update the account balance has not been completed, in order to prioritize completion of the update request over the expiration request, using the processor.

2. The method as in claim 1, further comprising tracking completed requests using the consumed running order value.

3. The method as in claim 1, further comprising using the running order value to track requests sent by the account manager.

4. The method as in claim 1, wherein receiving the expiration request further comprises receiving the expiration request from the expirer.

5. The method as in claim 1, further comprising storing the consumed running order value in a notification metadata data store.

6. A computer implemented method for modifying a plurality of subaccounts asynchronously, comprising:
- receiving an update request to an account having a running order value at an account manager module, using a processor, the running order value indicating a number of update sub-requests received;
- sending an update sub-request for a subaccount of the account to a subaccount changer module from the account manager module to initiate a single transaction to update an account balance, the single transaction being associated with the running order value;
- receiving an expiration request at an expiration time for the subaccount with a consumed running order value at the account manager module, the consumed running order value indicating a number of update sub-requests completed; and
- sending the expiration request from the account manager module to be applied to the subaccount by the subaccount changer module when a determination has been made that the single transaction to update the account balance is completed and prioritized over the expiration request by checking the running order value against the consumed running order value at the account manager module, using the processor.

7. The method as in claim 6, further comprising rescheduling the expiration request when it is determined that the running order value and the consumed running order value are different.

8. The method as in claim 6, further comprising blocking the expiration request when the running order value and the consumed running order value are different.

9. The method as in claim 6, further comprising updating the subaccount with loyalty incentives selected from the group consisting of: loyalty points, discount transactions, rebate transactions, merchant cash, incentive merchandise, and cash incentive transactions.

10. The method as in claim 6, further comprising updating the subaccount by updating a balance of loyalty points.

11. The method as in claim 10, further comprising enabling the use of the loyalty points in purchasing goods and services.

12. The method as in claim 6, wherein sending the expiration request further comprises sending the expiration request to an account balance manager from an expirer.

13. The method as in claim 6, further comprising tracking the running order value for completed requests using the consumed running order value.

14. The method as in claim 6, further comprising incrementing the running order value for the account when a request is sent from an account balance manager.

15. The method as in claim 6, further comprising closing the subaccount when the expiration request is completed.

16. The method as in claim 6, further comprising using the running order value and the consumed running order value for debits to the account.

17. The method as in claim 6, further comprising using a second running order value and a second consumed running order value for credits to the account to increase a probability of acquiring a lock.

18. The method as in claim 6, further comprising expiring the subaccount without locking the subaccount to be expired.

19. A non-transitory computer-readable medium comprising computer-executable instructions which, when executed by a processor, implement a system for asynchronously expiring an account value, comprising:
- an account having a loyalty balance;
- a plurality of subaccounts for the account, the subaccounts having loyalty sub-balances;
- an account manager module to update the loyalty balance for the account in response to update requests, using a processor, the running order value indicating a number of update sub-requests received and each update sub-request initiating a single transaction and being associated with the running order value to indicate a number of update sub-requests received;
- a subaccount changer module to receive the update sub-requests and modify the subaccount based on the update sub-requests using the processor;
- an expirer module to generate an expiration request to be sent to the subaccount changer module via the account manager module at an expiration time, wherein the expiration request is associated with a consumed running order value, the consumed running order value indicating a number of update sub-requests completed, and an expiration request for the subaccount fails when the consumed running order value and the running order value are determined to be different, indicating that the single transaction to update the loyalty balance has not been completed, in order to prioritize completion of the update request over the expiration request, using the processor.

20. The computer-readable medium as in claim 19, wherein the system further comprises a notification listener to sequentially order update requests and expiration requests using the running order value.

21. The computer-readable medium as in claim 19, wherein the system further comprises a notification metadata to store a consumed running order value.

22. The computer-readable medium as in claim 19, wherein a consumed running order is based on the running order value assigned to completed requests.

23. The computer-readable medium as in claim 19, wherein the running order value is used for optimistic locking.

24. The computer-readable medium as in claim 19, wherein the account manager associates a timestamp with update requests and the expiration requests.

* * * * *